UNITED STATES PATENT OFFICE.

UTLEY WEDGE, OF ARDMORE, PENNSYLVANIA.

IRON-PYRITES CHARGE FOR DESULFURIZING-FURNACES AND METHOD OF PREPARING SAME.

No. 804,691.  Specification of Letters Patent.  Patented Nov. 14, 1905.

Application filed June 15, 1904. Renewed July 26, 1905. Serial No. 271,391.

*To all whom it may concern:*

Be it known that I, UTLEY WEDGE, a citizen of the United States, residing in Ardmore, Pennsylvania, have invented certain Improvements in Iron-Pyrites Charges for Desulfurizing-Furnaces and in Preparing Same, of which the following is a specification.

My invention consists of an improvement in or modification of that forming the subject of my Letters Patent No. 757,531, dated April 19, 1904, the object of my present invention being to effect the formation of the "pyrites fines" or "pyrites smalls" into lumps, blocks, or briquets by the use of a binding agent or agents which may in many cases be considered preferable to that formerly used.

An impure sulfate of soda results from the mixture of sulfuric acid and nitrate of soda in the niter-oven which is interposed between the pyrites-burners and the Glover tower of sulfuric-acid apparatus, the heat from the burners assisting the reaction between the sulfuric acid and the nitrate of soda, and nitric-acid fumes being thrown off and sulfate of soda secured as a by-product. In many localities this sulfate of soda is not marketable and is a waste product. It contains a certain percentage of sulfuric acid, the latter having been used in excess in order to secure a proper decomposition of the nitrate of soda. This excess of sulfuric acid renders the sulfate of soda especially available as a binder for the fine pyrites, if said sulfate is used in connection with pyrites-cinder or other form of oxid of iron, the sulfuric acid combining with the latter to form a sulfate of iron which, in conjunction with the sulfate of soda, constitutes a very effective binding agent for the pyrites. The sulfate of soda may, however, be used alone, if desired, the fact that it is a waste product rendering it more desirable than a bonding agent which has a market value, although it is preferable to use it in connection with sulfate of iron, since the combination of the two produces a more effective bonding agent than the sulfate of soda alone.

Various methods of preparing the sulfate of soda for use as a binder for the fine pyrites or for admixture with sulfate of iron for the purpose may be adopted within the scope of my invention. For instance, the cake of sulfate from the niter-pot may be reduced to powdered or granular form and mixed with the fine pyrites preparatory to the formation of the latter into lumps, blocks, or briquets, or said cake of sulfate may be dissolved in water and the solution mixed with the fine pyrites, or the powdered or granular cake of sulfate or the solution of the same may be mixed with the pyrites-cinder when it is desired to form a binder consisting of sulfate of soda and sulfate of iron, or the sulfate of soda and sulfate of iron may be ground together in a pug-mill or other suitable mixer, or solutions of both sulfate of soda and sulfate of iron may be mixed together to form the bonding agent for the pyrites, or the combination of sulfate of soda and sulfate of iron can be formed directly in the niter-pot of the sulfuric-acid apparatus by charging the pyrites-cinder directly onto the sulfate of soda contained in the niter-pot, the heat in this case serving to facilitate the reaction, or the pyrites-cinder may be charged into the niter-pot with the original charge of nitrate of soda and sulfuric acid, so that the product remaining in the pot after the escape of the nitric-acid fumes will consist of sulfate of soda and sulfate of iron instead of sulfate of soda alone.

In some cases I may employ nitrate of soda instead of sulfate of soda for the bonding agent. In such case I mix the nitrate of soda with the pyrites fines or pyrites smalls and form the latter into blocks, bricks, or lumps in any suitable way, so that both sulfur and niter fumes will result from the heating of the pyrites in the furnace or oven, and a much less quantity of nitrate of soda and sulfuric acid will be needed in the niter-oven, the latter only being employed as a regulator or to supply the limited volume of nitric-acid fumes necessary to complete the process.

In many cases it may be advisable to add some nitrate of soda to the sulfate of iron used as a binder for the pyrites in accordance with the invention of my former patent, for the pyrites sometimes contains a small quantity of monosulfid of iron, and the sulfate of iron ordinarily contains some excess sulfuric acid which acts upon the monosulfid of iron to form sulfureted hydrogen, which in turn acts upon the ferric sulfate, reducing it to ferrous sulfate, which is not as good a binder as the ferric sulfate. When nitrate of soda is present, however, the sulfureted hydrogen acts upon the same to produce sulfuric acid and the ferric sulfate is not reduced. This, therefore, renders unnecessary the addition of carbonate or oxid of lime, barium, or like reagent, which might otherwise have to be used to neutralize the excess sulfuric acid in the sulfate of iron. The addition of such reagent would result in the formation of its sulfate, and while this would tend to harden the briquet its use in any considerable quantity would interfere with the proper desulfurization of the pyrites.

In case nitrate of soda is used in connection with neutral sulfate of iron its presence assists in the desulfurization of the resultant briquet, because of the energetic reaction between sulfate of iron and nitrate of soda when heated together.

In the impure sulfate of soda which is obtained from the niter-oven there is usually contained a small percentage of undecomposed nitrate of soda, which, to the extent that it is present, may produce the intended effect.

Lumps, blocks, or briquets of pyrites fines or pyrites smalls made in accordance with my present invention possess all of the advantages of those of the former patent in that they contain no foreign element which will adulterate the sulfurous-acid gas or retard the subsequent conversion of said gas into sulfuric acid. In fact, when the nitrate of soda is used as a binder such conversion is, as before indicated, facilitated instead of being retarded.

The present invention also possesses the same advantage as the former one in rendering available for roasting in rock-ore kilns or burners those pyrites fines or pyrites smalls which are in their natural state only available for roasting in mechanical furnaces.

Having thus described my invention, I claim and desire to secure by Letters Patent—

1. The mode herein described of preparing "pyrites fines" or "pyrites smalls" for desulfurization, said mode consisting in mixing them with a binder containing sulfate of soda, and forming the mass into lumps, blocks or briquets, substantially as specified.

2. The mode herein described of preparing "pyrites fines" or "pyrites smalls" for desulfurization, said mode consisting in mixing them with a binder containing a salt of sodium and sulfate of iron, and forming the mass into lumps, blocks or briquets, substantially as specified.

3. The mode herein described of preparing "pyrites fines" or "pyrites smalls" for desulfurization, said mode consisting in mixing them with a binder containing sulfate of soda and sulfate of iron, and forming the mass into lumps, blocks or briquets, substantially as specified.

4. The mode herein described of preparing "pyrites fines" or "pyrites smalls" for desulfurization, said mode consisting in mixing oxid of iron with sulfate of soda containing sulfuric acid, and then using the resulting compound as a binder for uniting the "pyrites fines" or "pyrites smalls" into lumps, blocks or briquets, substantially as specified.

5. The mode herein described of preparing "pyrites fines" or "pyrites smalls" for desulfurization, said mode consisting in charging oxid of iron into the niter-pot of sulfuric-acid apparatus containing a salt of sodium and sulfuric acid, and utilizing the resultant product as a binder for uniting the "pyrites fines" or "pyrites smalls" into lumps, blocks or briquets, substantially as specified.

6. The mode herein described of preparing "pyrites fines" or "pyrites smalls" for desulfurization, said mode consisting in charging oxid of iron into the niter-pot of sulfuric-acid apparatus containing nitrate of soda and sulfuric acid, and utilizing the resultant product as a binder for uniting the "pyrites fines" or "pyrites smalls" into lumps, blocks or briquets, substantially as specified.

7. The mode herein described of preparing "pyrites fines" or "pyrites smalls" for desulfurization, said mode consisting in mixing them with a binder containing sulfate of soda, nitrate of soda and sulfate of iron, and forming the mass into lumps, blocks or briquets, substantially as specified.

8. As a new article of manufacture, a lump, block or briquet composed of "pyrites fines" or "pyrites smalls," and a binder containing sulfate of soda, substantially as specified.

9. As a new article of manufacture, a lump, block or briquet composed of "pyrites fines" or "pyrites smalls," and a binder containing a salt of sodium and sulfate of iron, substantially as specified.

10. As a new article of manufacture, a lump, block or briquet composed of "pyrites fines" or "pyrites smalls," and a binder containing sulfate of soda and sulfate of iron, substantially as specified.

In testimony whereof I have signed my name to this specification in the presence of two subscribing witnesses.

UTLEY WEDGE.

Witnesses:
 WALTER CHISM,
 JOS. H. KLEIN.